(12) United States Patent
Winkler et al.

(10) Patent No.: US 9,542,165 B2
(45) Date of Patent: Jan. 10, 2017

(54) MODEL TO PETRI-NET TRANSFORMATION

(71) Applicants: Ulrich Winkler, Belfast (GB); Robert Fritzsche, Belfast (GB); Wasif Gilani, Newtownabbey (GB)

(72) Inventors: Ulrich Winkler, Belfast (GB); Robert Fritzsche, Belfast (GB); Wasif Gilani, Newtownabbey (GB)

(73) Assignee: SAP SE, Walldorf (DE)

( * ) Notice: Subject to any disclaimer, the term of this patent is extended or adjusted under 35 U.S.C. 154(b) by 269 days.

(21) Appl. No.: 13/676,350

(22) Filed: Nov. 14, 2012

(65) Prior Publication Data

US 2014/0137077 A1 May 15, 2014

(51) Int. Cl.
*G06F 9/44* (2006.01)

(52) U.S. Cl.
CPC .. *G06F 8/35* (2013.01); *G06F 8/34* (2013.01)

(58) Field of Classification Search
CPC ...................................... G06F 8/34; G06F 8/35
USPC .......................................................... 717/105
See application file for complete search history.

(56) References Cited

U.S. PATENT DOCUMENTS

2009/0089741 A1* 4/2009 Bornhoevd ............... G06F 8/34 717/106
2011/0265060 A1* 10/2011 Fritzsche et al. ............. 717/104

OTHER PUBLICATIONS

Dijkman et al., Formal Semantics and Analysis of BPMN Process Models using Petri Nets, 2007, Department of Technology Management, Eindhoven University of Technology, 30 pages.*
Ekkart Kindler, Model-Based Software Engineering and Process-Aware Information Systems, 2009, Technical University of Demark, pp. 27-45.*
Krumnow et al., Architecture Blueprint for a Business Process Simulation Engine, 2010, Hasso Plattner Institute, University of Potsdam, Germany, 15 pages.*
Remko Popma, JET Tutorial Part 1, May 31, 2004, Azzurri Ltd., 11 pages.*
Raedts et al., Transformation of BPMN models for Behaviour Analysis, 2007, LaQuSo, Laboratory for Quality Software, 12 pages.*
Balogh et al., Advanced Model Transformation Language Constructs in the VIATRA2 Framework, 2006, Budapest University of Technology and Economics, pp. 1280-1287.*

(Continued)

*Primary Examiner* — Hang Pan
*Assistant Examiner* — Hui-Wen Lin
(74) *Attorney, Agent, or Firm* — Fish & Richardson P.C.

(57) ABSTRACT

Implementations of the present disclosure include methods, systems, and computer-readable storage mediums for model-to-model transformation including actions of providing a source meta-model, the source meta-model having a plurality of classes and one or more references, receiving first user input to a graphical editor, processing the first user input to provide a plurality of class modules and one or more reference modules, each class module corresponding to a class of the plurality of classes and each reference module corresponding to a reference of the one or more references, automatically generating transformation code based on the plurality of class modules and the one or more reference modules, receiving a source model, the source model being provided based on the source meta-model and being provided in a computer-readable file that is stored in memory, and generating a simulation model based on the source model and the transformation code.

17 Claims, 6 Drawing Sheets

(56) References Cited

OTHER PUBLICATIONS

Prof. Dr. U. ABmann, "3. Modelling Dynamic Behavior with Petri Nets", Oct. 17, 2012, Technische Universitat Dresden Institut fur Software-und Multimediatechnik Gruppe Softwaretechnologie, Version 12-1.0, 21 pages.*
Winkler et al., BOB the Builder: a Fast Model-to-PetriNet Transformer, ECMFA 2012, LNCS 7349, pp. 416-427.
Fehling, A Concept of Hierarchical Petri Nets with Building Blocks, Lecture notes in Computer Science; Advances in Petri Nets 1993, Springer-Verlag Berlin Heidelberg 1993, pp. 148-168.
Fritzsche, Towards Performance Related Decision Support for Model Driven Engineering of Enterprise SOA applications, 15th Annual IEEE International Conference and Workshop on the Engineering Computer Based Systems, 2008, pp. 57-65.
Fritzsche et al., Application of Tracing Techniques in Model-Driven Performance Engineering, In: Proceedings of the 4th ECMDA Traceability Workshop (ECMDA-TW) 2008, pp. 111-120.
Jensen, Coloured petri nets [online] http://www.fit.vutbr.cz/study/courses/PES/public/Pomucky/CPNSlides96.pdf, 1987, 100 pages.
Jouault et al., ATL: A model transformation tool. In: Science of Computer Programming. vol. 72, 2008, pp. 31-39.
Lohmann et al., Petri Net Transformations for Business Processes—A Survey, Transactions on Petri Nets and Other Models of Concurrency, 2009, pp. 46-63.
Mu et al., A Review of Synthesis Techniques for Petri Nets, In: Proceedings of Computer Integrated Manufacturing, 1990 IEEE, pp. 348-355.
Object Management Group: MOF QVT Final Adopted Specification, [online] http://www.iist.unu.edu/~vs/wiki-files/MOFQVTSpec.pdf , Nov. 2005, 204 pages.
Object Management Group: Business Process Modeling Notation V1.1, [online] http://www.omg.org/bpmn/Documents/BPMN_1-1_Specification.pdf , Jan. 2008, 318 pages.
Raedts et al., Transformation of BPMN Models for Behaviour Analysis, in Proc. MSVVEIS 2007, J. Augusto, J. Barjis, and U. Ultes-Nitsche, Eds. INSTICC Press, 2007, pp. 126-137.
Clayberg et al., Eclipse: Building Commercial-Quality Plug-Ins, [online] http://www.oracle.com/technetwork/server-storage/ts-5418-159324.pdf, 2006, 68 pages.
W.M.P. Van der Aalst, YAWL: Yet Another Workflow Language, Information Systems (4), Jun. 2005, pp. 245-275.
Zuberek, Petri Nets in Hierarchical Modeling of Manufacturing Systems, IFAC Control Systems Design, Jun. 18-20, 2000, Bratislava, Slovak Republic, pp. 283-288.

* cited by examiner

MODEL TO PETRI-NET TRANSFORMATION

BACKGROUND

Modeling concepts are used for modeling various processes, such as business processes. Petri-Nets are a modeling concept that can be used to model processes. In some examples, even the simplest form of Petri-Nets (e.g., ordinary place/transition nets) provides a very expressive modeling concept. In some examples, extensions (e.g., inhibitor arcs, time, priorities) make Petri-Nets Turing complete.

The uptake of Petri-Net based simulations is low, because modeling industrial problems using Petri-Nets is not a trivial task. For examples, Petri-Nets do not provide support for constructing large models. Modeling a complete business process, for example, with several activities and associated resources (e.g., an enterprise-scale business process) becomes a complex, cumbersome task when using Petri-Nets. Model transformations have been introduced to address this problem.

SUMMARY

Implementations of the present disclosure include computer-implemented methods for model-to-model transformation, the methods being performed using one or more processors and including the actions of providing a source meta-model, the source meta-model having a plurality of classes and one or more references, receiving first user input to a graphical editor, processing the first user input to provide a plurality of class modules and one or more reference modules, each class module corresponding to a class of the plurality of classes and each reference module corresponding to a reference of the one or more references, automatically generating transformation code based on the plurality of class modules and the one or more reference modules, receiving a source model, the source model being provided based on the source meta-model and being provided in a computer-readable file that is stored in memory, and generating a simulation model based on the source model and the transformation code.

In some implementations, actions further include graphically displaying at least a portion of the transformation code in the graphical editor, receiving second user input, and editing the transformation code based on the second user input.

In some implementations, generating a simulation model includes creating an empty simulation model, iterating over elements of the source model and, for each element, identifying a corresponding class module, and generating an instance of the corresponding module and populating the empty simulation model with the instance.

In some implementations, generating a simulation model further includes generating an instance of a reference module, and connecting instances of class modules based on the instance of the reference module to provide the simulation model.

In some implementations, each class module and each reference module is provided as a template module having one or more attributes that can be edited by a user.

In some implementations, actions further include, for each class having a reference therefrom, providing an emitter module, for each reference, providing a multiplier module, for each class having a reference thereto, providing a collector module, and providing arcs between emitter modules, multiplier modules and collector modules to define a reference module.

In some implementations, the emitter module defines which class is to receive a message, the multiplier module provides a channel for communicating the message, and the collector module specifies an order in which messages are to be received.

In some implementations, each module includes a plurality of identifiers associated therewith.

In some implementations, an identifier of the plurality of identifiers includes a module identifier (MID) that is unique to elements within a module and that can be identical in a plurality of modules.

In some implementations, an identifier of the plurality of identifiers includes a universal unique identifier (UUID) that uniquely identifies a respective module.

In some implementations, the simulation model includes a behavior analysis model (BEAM) provided as a modular Petri-Net (PN) model including extensions.

In some implementations, the extensions support model transformation and model tracing.

In some implementations, the source model is a process model.

In some implementations, the source model is provided in business process modeling notation (BPMN).

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to improving the utility of Petri-Nets (PN) in modeling processes, such as business processes. In some implementations, model-driven technologies, such as model-to-model transformations and model tracing are used. In some examples, model transformation enables the transformation of a source model (e.g., a business process modeling notation (BPMN) model) into a PN model. In some implementations, the PN model is used to conduct one or more analyses (e.g., simulations and model checking) In some implementations, results of the one or more analyses are transformed back to the source model (e.g., the BPMN model) and can be visualized in the context of the source model.

In some implementations, a template-based approach is provided to define a transformation, one or more graphical editors can be provided to model templates, and code generation is provide to transform each template into transformation code. In some examples, implementations of the present disclosure can be provided as a framework that is integrated within an integrated development environment (IDE) (e.g., Eclipse) to provide streamlined design, coding, testing and debugging of transformations. In some examples, the framework can include a behavior analysis model (BEAM) and a BEAM orchestration and builder (BOB) framework. In some examples, the BEAM is provided as a modular PN model with extensions that are useful for model transformations and model tracing. In some examples, the BOB framework is provided as a transformation framework for modular PN models. In some examples, one or more graphical tools to define transformations based on templates. In some examples, the BOB framework generates transformation code based on the user-defined templates.

Implementations of the present disclosure will be described in view of an example modeling notation. The example modeling notation includes BPMN. It is appreciated, however, that implementations of the present disclosure can be realized used other example modeling notations. Further, implementations of the present disclosure will be described with reference to an example source model provided as a meta-model. In some examples, the meta-model can include an ECORE-based meta-model that includes multiple classes. In some examples, ECORE is a component (e.g., of an IDE) that provides a complete environment to create, edit and maintain models. Example classes can include class A, class B and class X. In accordance with the example, meta-model, class X can extend class B, and class A can have a zero-to-many reference to class B. The example meta-model can be named simple.Example. It is appreciated, however, that implementations of the present disclosure can be realized used other example meta-models.

Figure 1:
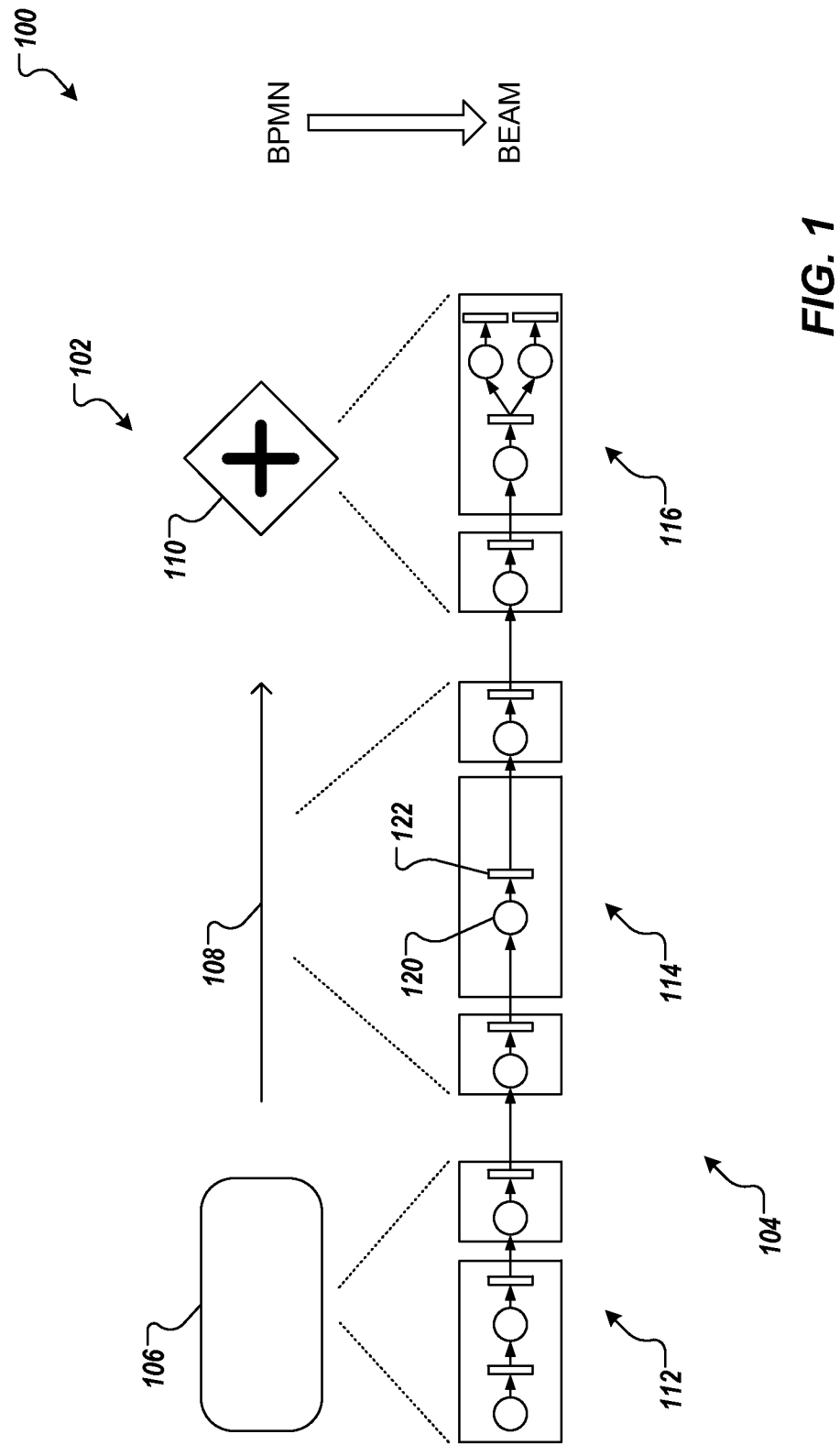
FIG. 1 depicts an example model transformation in accordance with implementations of the present disclosure.

FIG. 1 depicts an example model transformation 100 in accordance with implementations of the present disclosure. More particularly, the example model transformation 100 includes an example transformation of a BPMN model 102 to a BEAM 104. In the depicted example, the BPMN model 102 depicts a simple process (e.g., business process) that includes an activity object 106, a flow link object 108 and a gateway object 110. The flow link object 108 connects the activity object 106 and the gateway object 110. In the depicted example, the BEAM 104 is a modular PN model and includes a plurality of BEAM modules. In the depicted example, the BEAM modules include an activity module 112, a flow link module 114 and a gateway module 116. In some examples, the BEAM 104 models the behavior of the process. In some examples, parts of the PN are grouped by rectangles, which are referred to as modules. In the depicted example, the activity module 112 describes the internal behavior of the activity object 106, the flow link module 114 describes how the flow link object 108 connects the activity object 106 and the gateway object 110, and the gateway module 116 describes the functionality of the gateway object 110. In some examples, each BEAM module includes one or more places 120 and one or more transitions 122.

In accordance with implementations of the present disclosure, a simulation developer creates templates of a basic PN structure for all meta-classes of the source meta-model at design-time. In the example case, a simulation developer can create templates of a basic PN structure for all meta-classes of a BPMN meta-model. The template PN modules can be referred to as class modules. In some examples, if a meta-class contains a reference to other meta-classes (or to itself) the simulation developer can also provide templates describing how class modules should be connected by reference modules. As discussed herein, the modules are compiled by a BEAM compiler into code (e.g., Java code). In some examples, the simulation developer can refine (e.g., edit) the generated code as desired.

Figure 2:
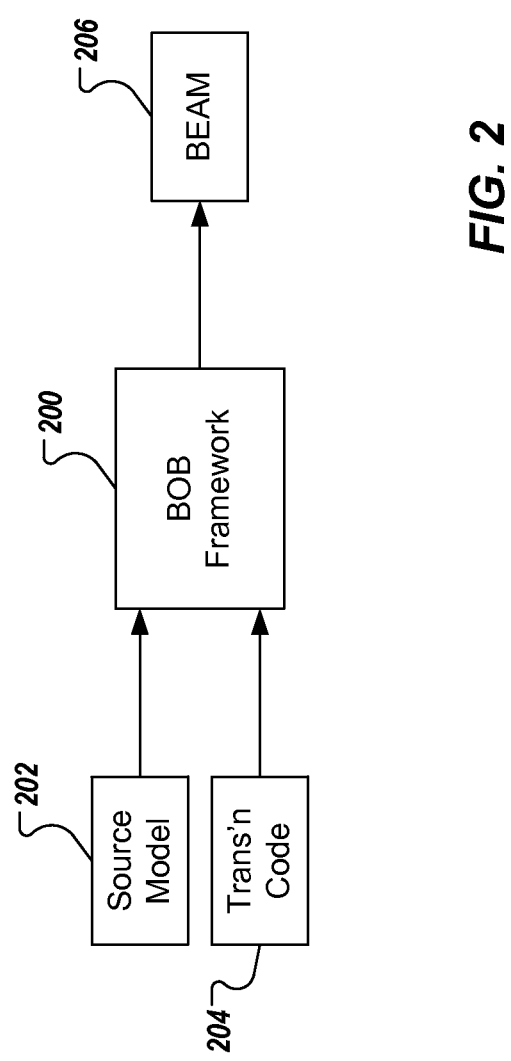
FIG. 2 depicts example components for transformation.

FIG. 2 depicts example components for transformation. In some implementations, at run-time, a BOB framework 200 (the BOB transformation process) takes a source model 202 (e.g., a BPMN model), generated transformation code 204 and produces a BEAM 206. In some examples, the BOB framework 200 can be provided as one or more computer-executable programs that are executed by one or more computing devices. In some examples, the source model 202 and/or the transformation code 204 can be provided as one or more computer-readable files that can, for example, be read by one or more computing devices that provide the BOB framework 200. In some examples, the BEAM 206 can be provided as one or more computer-readable files that can, for example, be generated by one or more computing devices that provide the BOB framework 200.

In some implementations, the BOB framework creates an empty BEAM. In some implementations, the BOB framework (also referred to as a transformer herein) iterates over all elements in the source model. For each element of the source model, the transformer determines a meta-model class of the element and identifies a corresponding BEAM module (e.g., activity module, flow link module, gateway module). If a BEAM module is provided for the meta-model class, the transformer creates an instance of the particular module and inserts the instance in the BEAM. That is, the transformer populates the empty BEAM with the instance. This can be referred to as class module generation. In some examples, after all class patterns have been created, the transformer fuses the patterns together within the BEAM. In some examples, pattern fusing can be achieved by creating instances of reference modules and connecting places and transitions between different class modules and reference modules.

In some implementations, a BEAM can be provided as a generalized stochastic PN model which supports, for example, read, reset and inhibitor flow links. In some examples, places and transitions of a BEAM are provided in modules (as discussed above with reference to FIG. 1). In some examples, the BEAM is provided as a PN model that includes support for transformation into the BEAM (e.g., as a meta-model). In some examples, a BEAM module (e.g., activity modules 112, flow link modules 114 and gateway modules 116 of FIG. 1) is provided as a basic building block in the BOB framework. A BEAM module, which can be provided in a BEAM file, can group nodes (e.g., places and transitions) and arcs of the PN.

In some examples, each module has identifiers associated therewith. Example identifiers include a module identifier (MID) and a universal unique identifier (UUID). In some examples, the UUIDs are different for each module. In some examples, the MIDs are only unique for elements within a module, but can be the same within two or more modules. In some examples, two different modules that have the same MID can be treated as the same "type" of module. In some examples, MIDs can be used by a BEAM synchronizer to synchronize modules across files, as discussed herein. In some examples, each module has a module type (e.g., BOB_MODULE_TYPE) associated therewith. The module type can be used by the transformer to determine how and when to create and fuse modules.

In some examples, a distinction can be made between template modules and instance modules. In some examples, a template module is provided by the simulation developer and can serve as a basic pattern for the transformer to transform a source model object into a PN representation, which can be referred to as instantiation. Once the transformer creates an instance of a template module, the instance can be referred to as an instance module. In some examples, a module can include other modules and thus can form a hierarchy. Such hierarchies can be used, for example, by the transformer to reflect the internal structure of the source model.

In an example implementation, a simulation developer can create an Example-Model-to-BEAM transformation. In some examples, the simulation developer can begin modeling activities by creating a BOB library project using a BOB project generator. In some examples, the BOB project generator can be provided as a component of the BOB framework (e.g., the BOB framework 200 of FIG. 2). In some examples, the simulation developer can provide user input that identifies a source model (e.g., a meta-model). In some examples, based on the user input, the BOB project generator can load the source model and can initialize the BOB library project.

In some examples, the BOB library project can be provided as an Eclipse Java project with additional BOB build natures, a BEAM compiler nature (also referred to as a BEAM module compiler) and the BEAM synchronizer nature (also referred to as a BEAM synchronizer). In some examples, a Java project contains source code and related files for building a Java program. In some examples, the BOB project generator initializes the basic project structure and generates BEAM packages for all classes of the source model.

In some examples, a BEAM package is a set of template BEAM modules and auxiliary code (e.g., Java code) that can define how a source model object (e.g., the activity 106, the flow link 108 and the gateway 110 of FIG. 1) is to be transformed into BEAM modules, orchestrated and composed by the transformer during a transformation. With reference to the example meta-model, the BOB project generator would produce a BEAM package for each of class A, class B and class X. In view of the example meta-model, the transformer can create a BEAM package beam.bob.simple.example.a for class A, a BEAM package beam.bob.simple.example.b for class B, and a BEAM package beam.bob.simple.example.x for class X. In some examples, after the BOB project generator has initialized the basic project structure and all BEAM packages, the simulation developer can fill in the initially empty BEAM module templates and model the basic behavior using one or more graphical editors.

In some examples, a project (e.g., an Eclipse Java project) can have zero or more associated build-natures. In some examples, a run-time environment (e.g., an Eclipse run-time environment) can monitor all files within a project. If a file has been created, changed or deleted, all build-natures are notified. In response to a notification the build nature can determine what to do with the received notification. A Java build nature, for example, would compile a Java source code file into a Java class code file.

In some examples, the BEAM module compiler takes a particular BEAM module and generates code (e.g., Java code) that would provide the BEAM module. In some examples, because the BEAM module compiler can be provided as a part of a build nature, the BEAM module compiler can be invoked whenever the simulation developer or the BEAM synchronizer changes a BEAM module definition.

In some examples, BEAM modules of the same type can be used in different BEAM files within a project. The BEAM synchronizer can detect changes made to a BEAM module and can apply the changes to all BEAM modules in the same project. In this manner, the simulation developer is not burdened with synchronizing all BEAM modules.

In some examples, the modeling environment used to provide the source model (e.g., ECORE) can support object oriented concepts (e.g., classes, interfaces and inheritance. In some examples, BEAM does not distinguish between interfaces and classes. Consequently, the BEAM project generator can produce a BEAM file with a single BEAM module for all classes and interfaces. With reference to the example meta-model, the BEAM project generator would create a single BEAM module in a BEAM file named A.beam in the package bob.simple.example.a. As discussed above, the BEAM modules define the internal behavior of a source model element (e.g., the internal behavior of an activity or a gateway).

With reference to the example process of FIG. 1, the flow link object 106 has two references, one reference that sources to the activity object 104 and one reference that targets to the gateway object 108. In this example, the only objective of the flow link module 114 is to transport tokens from the activity module 112 to the gateway module 116. However, in other use cases, the objective might be different and the simulation developer has to model a more complex behavior of a reference. In some examples, a reference can be regarded as a communication channel between objects, where a token is provided as the message sent over the channel. In some examples, the transformation of a reference to a BEAM component can be defined by a plurality of BEAM modules. The plurality of BEAM modules can include an emitter module, a multiplier module and a collector module. In some examples, the emitter module is used to define which object should receive a message and in which order. In some examples, the multiplier module is the channel itself and might be used to delay a message or to lose a message. In some examples, the multiplier module can be used to coordinate how messages are transmitted and/or delay a token that is being communicated to a receiver. In some examples, the collector module can be used to specify an order in which a receiver receives messages.

Figure 3:
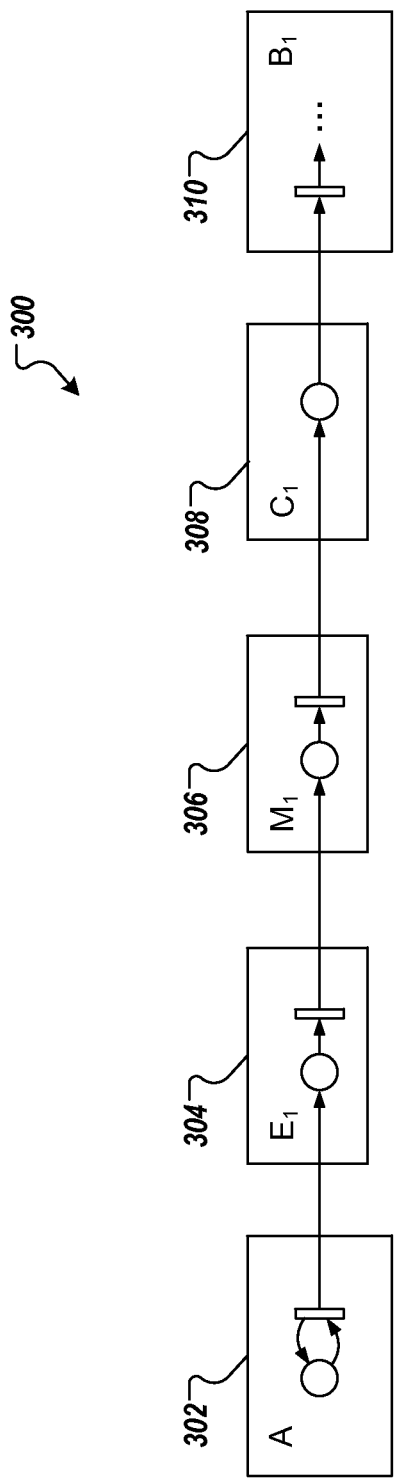
FIG. 3 depicts example template modules for an example reference.

Referring now to FIG. 3, example template modules for an example reference are depicted. More specifically, for every reference in a meta-model the BOB project generator generates templates for the simulation developer to fill in and to change according to need defined by the simulation developer. In some examples, the simulation developer uses a graphical editor to edit the templates. In some examples, the graphical editor depicts an empty template as an empty box, where the simulation developer puts and arranges transitions, places, and arcs in the empty box using the graphical editor (e.g., the GBEAM editor, discussed herein).

With reference to the example meta-model, the class A has a reference to the class B. Consequently, the BOB project generator creates a BEAM file (e.g., A_reference_B.beam) in the package (e.g., bob.simple.example.a). In some examples, the BEAM file includes a plurality of modules 300. Example modules include a class template 302 (for class A), an emitter template 304, a multiplier template 306, a collector template 308 and a class template (for class B).

In some examples, the simulation developer can use a graphical BEAM editor (e.g., a GBEAM editor) to fill in (edit) the templates. For example, and with continued reference to FIG. 3, the example templates 302, 304, 306, 308, 310 can be displayed within the GBEAM editor and the simulation developer can use the GBEAM editor to model the class A to class B reference templates 302, 310. For example, the simulation developer can use the GBEAM editor to define properties of each template. As one example, properties of the collector template 308 can include a name, an identifier (ID), an initial marking and a start identifier (Start Id). In some examples, a place can hold tokens, and a marking can refer to the number of tokens in a place. In some examples, the initial marking is provided as the initial number of tokens in a place (e.g., before a simulation run). The simulation developer can decide how many tokens are in each place before a simulation run, and the simulation run changes the number of tokens based on rules of Petri-Net based simulations. In some examples, the identifier (ID) is provided as the UUID, and the start identifier (Start Id) is provided as the MID.

In some examples, the GBEAM editor provides a "Project Explorer View" that displays the BOB library project package layout, generated code files (e.g., Java code files), the BEAM files, and GBEAM files. In some examples, the BEAM files include the BEAM whereas the GBEAM files include the graphical details of BEAM objects (e.g., layout, position, size).

Figure 4:
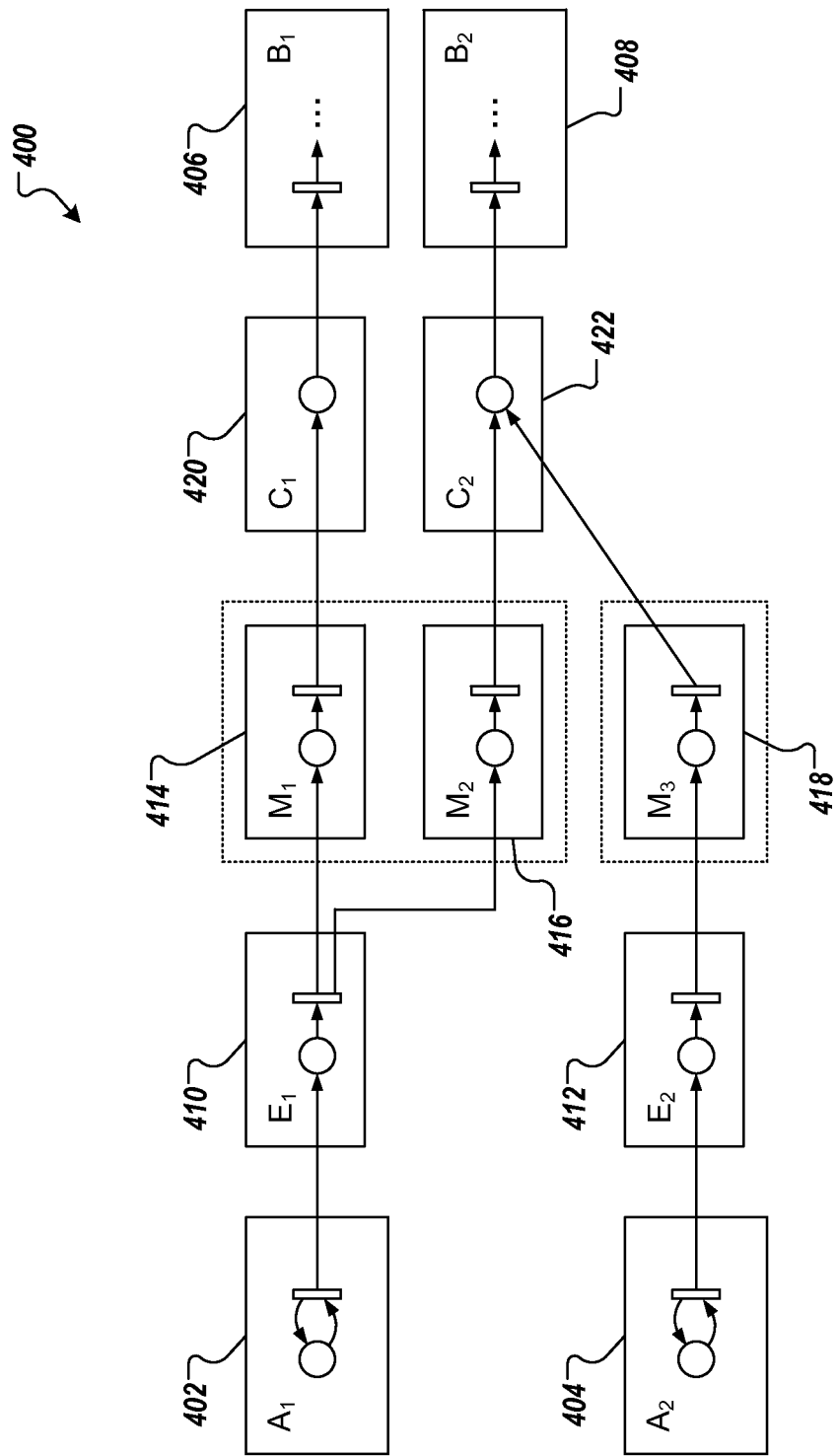
FIG. 4 depicts an example transformation result based on the example template modules of FIG. 3.

FIG. 4 depicts an example transformation result based on the example template modules of FIG. 3. A model instance 400 of the example meta-model is provided and includes a plurality of objects. In the depicted example, the plurality of object modules include a first class A object module 402 ($A_1$), a second class A object module 404 ($A_2$), a first class B object module 406 ($B_1$) and a second class B object module 408 ($B_2$). The first class A object module 402 includes references to both the first class B object module 406 and the second class B object module 408. The second class A object module 404 only references the second class B object module 408. The model instance 400 further includes a first emitter object module 410 ($E_1$), a second emitter object module 412 ($E_2$), a first multiplier object module 414 ($M_1$), a second multiplier object module 416 ($M_2$), a third multiplier object module 418 ($M_3$), a first collector object module 420 ($C_1$) and a second collector object module 422 ($C_2$).

The transformer generates object modules and reference modules as depicted in FIG. 4 based on a set of rules. In some examples, the set of rules includes, for each object that holds a reference (r), the transformer generates an emitter module. Accordingly, the emitter object modules 410, 412 are generated by the transformer, because the first class A object includes references to both the first class B object and the second class B object. In some examples, the set of rules includes, for each reference, the transformer produces a multiplier module. Accordingly, in the example of FIG. 4, three references are provided. Consequently, the multiplier object modules 414, 416, 418 are generated. In some examples, the set of rules includes, for each referenced object, the transformer generates a collector pattern. Accordingly, in the example of FIG. 4, the collector object modules 420, 422 are generated, because the first class B object and the second class B object are the referenced objects. The transformer fuses the object modules by providing arcs between emitter, multiplier and collector. Accordingly, implementations of modeling references, as discussed above, provides a very flexible way to define various scenarios. In most use cases, the above-describe reference modeling can be used to model references. If, however, a use case requires modeling of special behavior, the generated code (e.g., corresponding to an emitter, a multiplier and/or a collector) can be edited.

In some implementations, reference modeling efforts can be reduced. If, for example a reference is provided as a containment reference, the contained object does not need a collector module. This is because, for example, the containing object is the only object that holds a reference to the contained object. In some examples, if the reference is a one-to-one (1:1) reference (e.g., as opposed to a one-to-many reference), the multiplier modules can be omitted.

In accordance with implementations of the present disclosure, the BOB framework supports inheritance in a simple manner. For example, BEAM modules can include an override flag (e.g., the Boolean flag override). In some examples, the override flag is used to indicate whether the BEAM compiler should compile a particular template module. In some examples, the override flag can be used by the synchronizer to determine whether a module should be synchronized with its parent module.

Continuing with the example meta-model, the class X inherits from the class B (e.g., because the class X extends the class B, as discussed above). In some examples, the BOB project generator creates the same set of empty template modules for class X as for class B. If the simulation developer makes changes in the class B template module, these changes are also applied to the class X template module unless the override flag is set. In some examples, if the simulation developer changes the class X template module (as opposed to the class B template module), the override flag can automatically be set (e.g., to true). If the override flag is set, the synchronizer does not synchronize the class B and the class X template modules and the compiler generates the corresponding code. In some examples, if a meta-class has more than one super type (e.g., if the class X inherits from both the class A and the class B), this simple mechanism no longer fulfills its purpose. In this case, the BOB project generator can disable the inheritance feature by setting the override flag to true, and the simulation developer has to model the class.

In some implementations, the BEAM synchronizer can use uniform modeling description (UMD) of the BEAM module to synchronize modules across BEAM files. In some examples, this synchronization mechanism is not limited to modules generated by the BOB framework. For example, the simulation developer can create BEAM modules and can assign respective UUIDs thereto. In this manner, the simulation developer can create their own library of modules. If, for example, the simulation developer wants to include a module from a library, the simulation developer can create an empty module and can assign the same UUID to the empty module as a target module provided in the library. The synchronizer replaces the empty module with the module from the library. In this manner, the simulation developer is able to re-use modules and is able to create interfaces.

Implementations of the present disclosure further provide model tracing. In general, model tracing relates source model elements to specific places and transitions. For example, and with reference to the activity object 106 of FIG. 1, a process expert might want to learn about the queue length for the particular activity. In some examples, the queue is depicted as a place in the BEAM and, consequently, the queue length can be provided as the number of tokens in that place. Model tracing can provide a link between a process activity and an activity module instance. In some examples, model tracing can produce a tracing model. Using tracing techniques, however, can be cumbersome and are not needed for BEAM. Instead, implementations enable bi-directional tracing to be provided. In some examples, the bi-directional tracing is provided using a simple, easy to use approach. In some examples, if the source model element has a unique identifier associated therewith, the unique identifier is stored as an attribute by each BEAM module. If the source model element does not have a unique identifier associated therewith, a uniform resource indicator (URI) of the source model and a traversal path to the source model element can instead be stored.

In some examples, to identify specific places or transitions (e.g., the place that represents the queue of a process activity), MIDs and/or tagging of places, transitions and/or arcs can be used. Continuing with the example, the queue place can be assigned the MID activity-queue, for example. Consequently, whenever the process expert selects an activity element in the process modeling environment, the instance module for that activity and the queue place of the instance module can be identified based on the MIDs.

In general, unit testing can be provided as a method to determine whether a testable portion of an application or library meets design requirements and is ready for use. In some implementations, the smallest testable part of a BOB transformation is a template module. In some examples, the BOB project generator creates and initializes, for each class and reference, a unit test case. In some examples, unit tests can be used by the simulation developer to verify that each template module meets a set of initial design requirements and specifications. For example, a unit test for a gateway module can test whether the gateway correctly distributes tokens. In some examples, the BOB framework provides tools to simplify unit testing. For example, a BEAM simulator can be executed step-by-step to enable the simulation developer to observe and verify each state during a unit test run.

Figure 5:
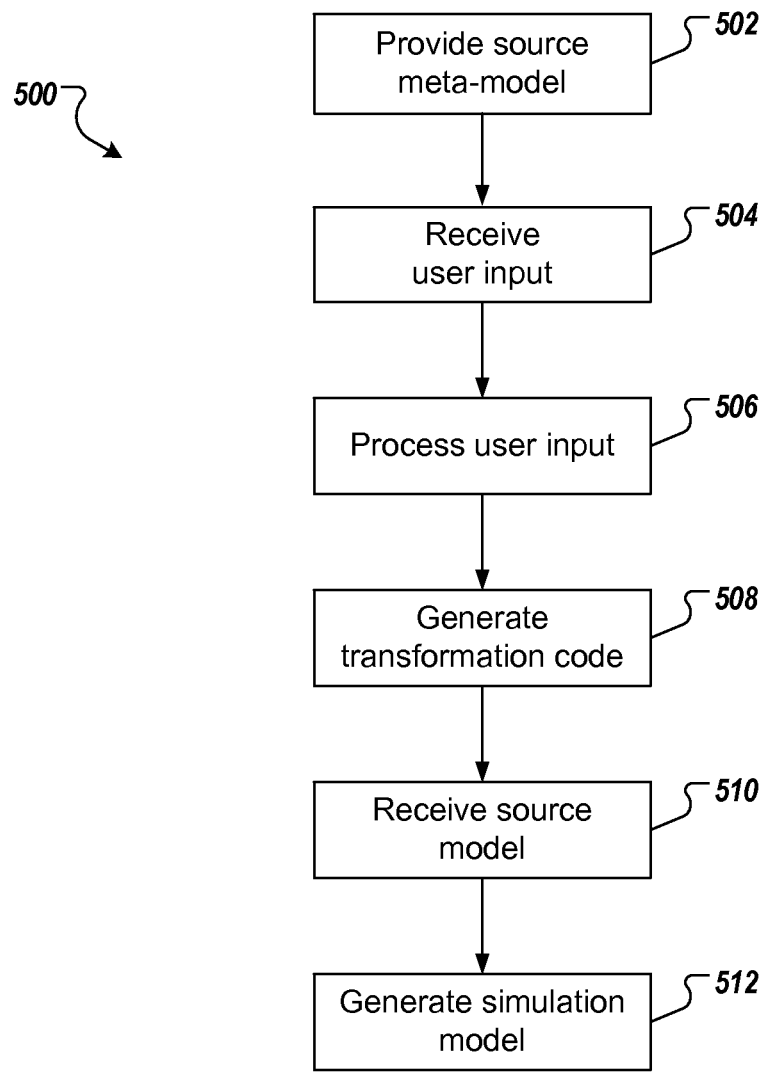
FIG. 5 is a flowchart depicting an example process that can be executed in accordance with implementations of the present disclosure.

FIG. 5 is a flowchart depicting an example process 500 that can be executed in accordance with implementations of the present disclosure. In some implementations, the example process 500 can be provided using one or more computer-executable programs that can be executed using one or more computing devices.

A source meta-model having a plurality of classes and one or more references is provided (502). For example, the source meta-model can be provided in a modeling language as a computer-readable file. User input to a graphical editor is received (504). For example, a simulation developer can provide user input to a graphical editor that provided as one or more computer-executable programs executed using one or more computing devices. The user input is processed to provide a plurality of class modules and one or more reference modules (506). As discussed herein, each class module can correspond to a class of the plurality of classes and each reference module can correspond to a reference of the one or more references. In some examples, the user input defines how class modules are to be connected by reference modules. Transformation code is automatically generated based on the plurality of class modules and the one or more reference modules (508). In some examples, actions 502, 504, 506, 508 can be performed during a design-time. A source model is received (510). In some examples, the source model is provided based on the source meta-model and is provided in a computer-readable file that is stored in memory. A simulation model is generated based on the source model and the transformation code (512). In some examples, actions 510, 512 are performed during a run-time. In some examples, the simulation model can be processed to simulate a process underlying the source model, and simulation results can be provided.

Implementations of the present disclosure overcome deficiencies of traditional model transformation approaches. Some traditional model transformation approaches, for example, implement transformation scripts (e.g., Atlas transformation language (ATL) scripts). In such approaches, a transformation developer has to write the transformation code. As discussed herein, implementations of the present disclosure provide graphical tools to draw the transformation, obviating the need to the developer to write transformation code. Further, and as discussed herein, implementations of the present disclosure generate transformation code based on the user input provided to a graphical editor (e.g., drawings), and, in the case of special requirements, the developer can alter (edit) the automatically generated transformation code. In some examples, because the transformation code is provided as native code (e.g. Java Code), and in-memory technology can be implemented, the transformations developed with the framework of the present disclosure are extremely fast (e.g., up to 4,000 times fast than, for example, model transformations based on ATL scripts.

Figure 6:
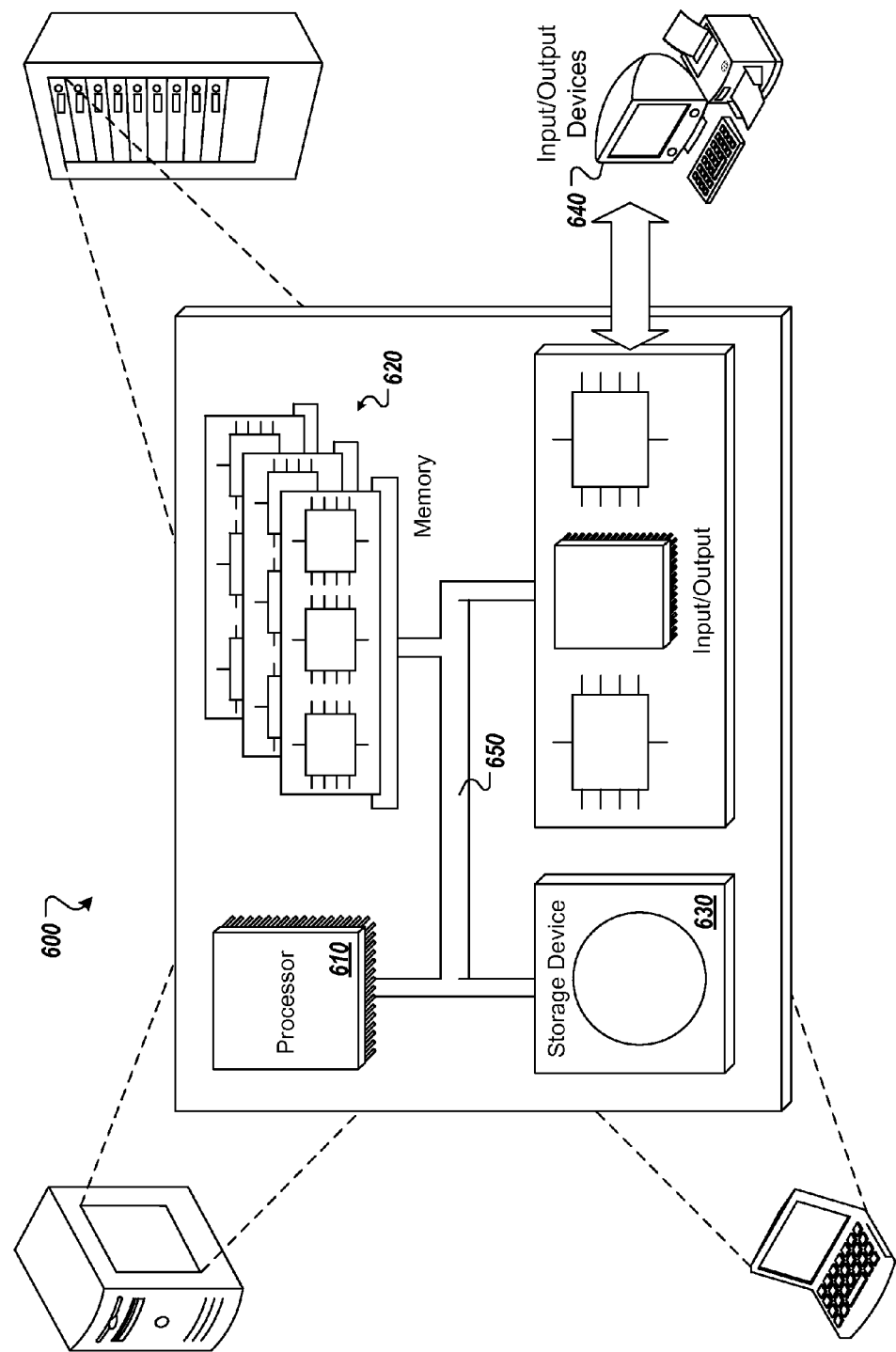
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, 640 is interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for model-to-model transformation, the method being executed using one or more processors and comprising:
   providing a source meta-model, the source meta-model having a plurality of classes and one or more references;
   receiving, by the one or more processors, a first user input to a graphical editor;
   processing the first user input to define a transformation by providing a plurality of class modules and one or more reference modules, each class module corresponding to a class of the plurality of classes and comprising a module type and each reference module corresponding to a reference of the one or more references;
   automatically generating a transformation code based on the plurality of class modules and the one or more reference modules, the transformation code defining the transformation of a source model comprising a business process modeling notation into a petri-net model and using the module type of each class module to determine how and when to fuse the plurality of class modules of the source model based on a pattern of the plurality of class modules;
   receiving, by the one or more processors, the source model, the source model being provided based on the source meta-model and being provided in a computer-readable file that is stored in memory; and
   generating, by the one or more processors, a simulation model based on the source model and the transformation code.

2. The method of claim 1, further comprising:
   graphically displaying at least a portion of the transformation code in the graphical editor;
   receiving a second user input; and
   editing the transformation code based on the second user input.

3. The method of claim 1, wherein generating the simulation model comprises:
   creating an empty simulation model;
   iterating over elements of the source model and, for each element, identifying a corresponding class module; and generating an instance of the corresponding module and populating the empty simulation model with the instance.

4. The method of claim 3, wherein generating the simulation model further comprises:
generating an instance of a reference module; and
connecting instances of class modules based on the instance of the reference module to provide the simulation model.

5. The method of claim 1, wherein each class module and each reference module is provided as a template module having one or more attributes that can be edited by a user.

6. The method of claim 1, further comprising:
for each class having a reference therefrom, providing an emitter module;
for each reference, providing a multiplier module;
for each class having a reference thereto, providing a collector module; and
providing arcs between the emitter module, the multiplier module and the collector module to define a reference module.

7. The method of claim 6, wherein the emitter module defines which class is to receive a message, the multiplier module provides a channel for communicating the message, and the collector module specifies an order in which messages are to be received.

8. The method of claim 1, wherein each module includes a plurality of identifiers associated therewith.

9. The method of claim 8, wherein an identifier of the plurality of identifiers includes a module identifier (MID) that is unique to elements within a module and that can be identical in a plurality of modules.

10. The method of claim 8, wherein an identifier of the plurality of identifiers includes a universal unique identifier (UUID) that uniquely identifies a respective module.

11. The method of claim 1, wherein the simulation model comprises a behavior analysis model (BEAM) provided as a modular Petri-Net (PN) model comprising extensions.

12. The method of claim 11, wherein the extensions support model transformation and model tracing.

13. The method of claim 1, wherein the source model is a process model.

14. The method of claim 13, wherein the source model is provided in the business process modeling notation (BPMN).

15. The method of claim 1, wherein generating further comprises creating instances of the one or more reference modules and connecting places and transitions between the plurality of class modules and the one or more reference modules.

16. A non-transitory computer-readable storage medium coupled to one or more processors and having instructions stored thereon which, when executed by the one or more processors, cause the one or more processors to perform operations for model-to-model transformation, the operations comprising:
providing a source meta-model, the source meta-model having a plurality of classes and one or more references;
receiving a first user input to a graphical editor;
processing the first user input to define a transformation by providing a plurality of class modules and one or more reference modules, each class module corresponding to a class of the plurality of classes and comprising a module type and each reference module corresponding to a reference of the one or more references;
automatically generating a transformation code based on the plurality of class modules and the one or more reference modules, the transformation code defining the transformation of a source model comprising a business process modeling notation into a petri-net model and using the module type of each class module to determine how and when to fuse the plurality of class modules of the source model based on a pattern of the plurality of class modules;
receiving a source model, the source model being provided based on the source meta-model and being provided in a computer-readable file that is stored in memory; and
generating a simulation model based on the source model and the transformation code.

17. A system comprising:
a computing device; and
a non-transitory computer-readable storage device coupled to the computing device and having instructions stored thereon which, when executed by the computing device, cause the computing device to perform operations for model-to-model transformation, the operations comprising:
providing a source meta-model, the source meta-model having a plurality of classes and one or more references;
receiving a first user input to a graphical editor;
processing the first user input to define a transformation by providing a plurality of class modules and one or more reference modules, each class module corresponding to a class of the plurality of classes and comprising a module type and each reference module corresponding to a reference of the one or more references;
automatically generating a transformation code based on the plurality of class modules and the one or more reference modules, the transformation code defining the transformation of a source model comprising a business process modeling notation into a petri-net model and using the module type of each, class module to determine how and when to fuse the plurality of class modules of the source model based on a pattern of the plurality of class modules;
receiving a source model, the source model being provided based on the source meta-model and being provided in a computer-readable file that is stored in memory; and
generating a simulation model based on the source model and the transformation code.

* * * * *